US012567890B2

(12) United States Patent
Kumar et al.

(10) Patent No.: US 12,567,890 B2
(45) Date of Patent: Mar. 3, 2026

(54) SYSTEMS AND METHODS FOR IMPROVING MIMO EFFICIENCY

(71) Applicant: Verizon Patent and Licensing Inc., Basking Ridge, NJ (US)

(72) Inventors: Arvind Kumar, Suwanee, GA (US); Sachin Vargantwar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 18/484,498

(22) Filed: Oct. 11, 2023

(65) Prior Publication Data

US 2025/0125842 A1 Apr. 17, 2025

(51) Int. Cl.
*H04L 5/12* (2006.01)
*H04B 7/0456* (2017.01)
*H04W 28/08* (2023.01)
*H04W 72/56* (2023.01)

(52) U.S. Cl.
CPC ...... *H04B 7/0478* (2013.01); *H04W 28/0967* (2020.05); *H04W 72/56* (2023.01)

(58) Field of Classification Search
CPC . H04B 7/0478; H04W 28/0967; H04W 72/56
USPC ............... 375/262, 260, 259, 219, 295, 316
See application file for complete search history.

(56) References Cited

U.S. PATENT DOCUMENTS

2021/0266049 A1*  8/2021  Kuchi ................... H04B 7/0632
2022/0377597 A1*  11/2022  Kotaru .................. H04W 72/04
2024/0314878 A1*  9/2024  Sung ..................... H04L 1/0026

* cited by examiner

*Primary Examiner* — Zewdu A Kassa

(57) ABSTRACT

Systems and methods described provide a multiple-input multiple-output (MIMO) optimization service. A network device in a RAN predicts high usage thresholds and available per-service resources for supporting MIMO transmissions. The network device identifies, based on the predicted usage thresholds, user equipment (UE) devices that have a high-throughput session and have high usage levels on a cell. The network device assigns, based on the predicted available per-service resources, sounding reference signal (SRS)-based MIMO resources to the UE devices in the cell and assigns codebook-based MIMO resources to other UE devices in the cell.

20 Claims, 6 Drawing Sheets

100

110

115

400

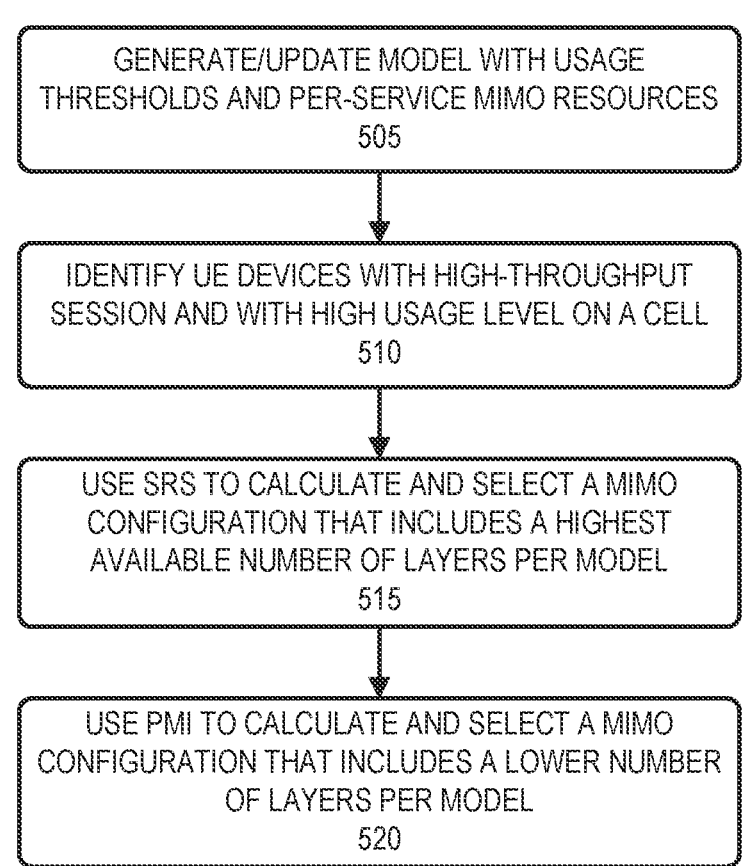

500

GENERATE/UPDATE MODEL WITH USAGE
THRESHOLDS AND PER-SERVICE MIMO RESOURCES
505

IDENTIFY UE DEVICES WITH HIGH-THROUGHPUT
SESSION AND WITH HIGH USAGE LEVEL ON A CELL
510

USE SRS TO CALCULATE AND SELECT A MIMO
CONFIGURATION THAT INCLUDES A HIGHEST
AVAILABLE NUMBER OF LAYERS PER MODEL
515

USE PMI TO CALCULATE AND SELECT A MIMO
CONFIGURATION THAT INCLUDES A LOWER NUMBER
OF LAYERS PER MODEL
520

Fig. 5

SYSTEMS AND METHODS FOR IMPROVING MIMO EFFICIENCY

BACKGROUND

Next Generation mobile networks, such as Fifth Generation (5G) mobile networks, are being implemented as the next evolution of mobile wireless networks. 5G mobile networks are designed to increase data transfer rates, increase spectral efficiency, improve coverage, improve capacity, and reduce latency. End devices may connect to a radio access network according to various types of configurations.

BRIEF DESCRIPTION OF THE DRAWINGS

FIG. 5 is a flow diagram illustrating another exemplary process of an exemplary embodiment of the MIMO optimization service.

DETAILED DESCRIPTION

Figure 1A:
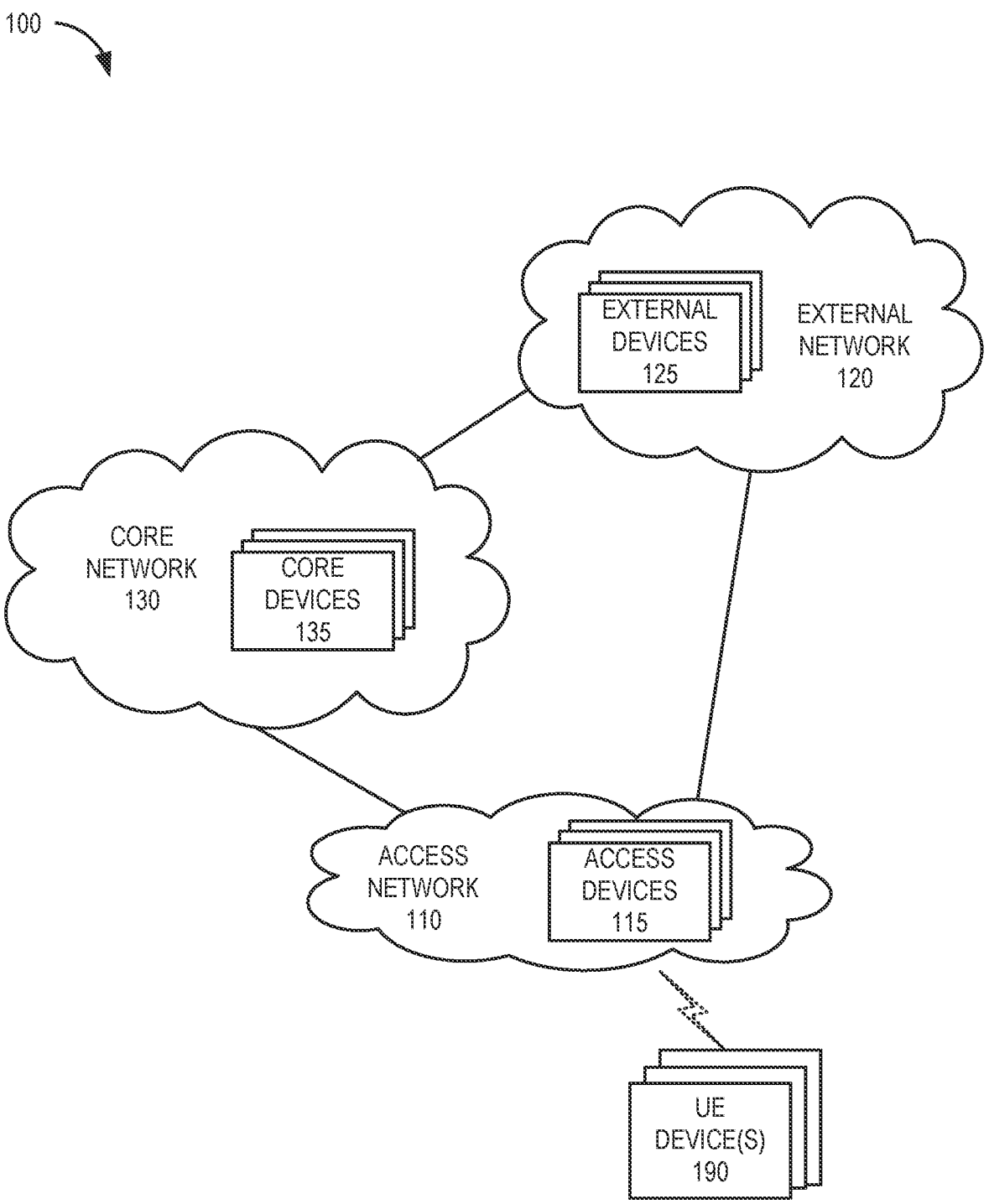
FIGS. 1A and 1B are diagrams illustrating an exemplary environment in which an embodiment of a Multi-Input Multi-Output (MIMO) optimization service may be implemented.

The following detailed description refers to the accompanying drawings. The same reference numbers in different drawings may identify the same or similar elements. Also, the following detailed description does not limit the invention.

Multi-Input Multi-Output (MIMO) technology supports two or more transmitters and receivers that are associated with a wireless device. The transmitters and receivers may enable the transmission and reception of wireless signals at the same time, for example. In 5G NR, massive MIMO facilitates the full potential for increasing network coverage, capacity, user throughput, spectral efficiency, among other things, while minimizing radio site densification. MIMO technology may be supported in both the uplink (UL) and the downlink (DL) transmissions.

Single-user MIMO (SU-MIMO) enables the transmission of one or multiple data streams (also called layers) from one transmitting array to a single user. The number of layers that may be supported (also called rank) may depend on the radio channel and the minimum number of antennas on each side. SU-MIMO may be achieved by sending different layers on different polarizations in the same direction or by sending different layers on different propagation paths (e.g., a multipath). In contrast, multi-user MIMO (MU-MIMO) enables the transmission of different layers in separate beams to different users using the same time and frequency resources.

Currently, MU-MIMO is used in high-capacity conditions and requires very good radio conditions to pair User Equipment (UE) devices in MU-MIMO. A base station (e.g., a next generation Node B (gNB) or another type of base station) can pair UE devices in MU-MIMO irrespective of service type. Inefficiency is introduced as the gNB may be allocating higher MIMO layers to UE devices that do not benefit from the higher capacity (e.g., UE devices executing Voice over New Radio (VoNR) applications) or allocating low MIMO layers to UE devices that could benefit from higher capacity (e.g., UE devices executing gaming applications). Another impact is that UE devices which are paired in MU-MIMO may have the number of layers reduced (e.g., from 4 layers to 2 layers) when resources are limited, which can impact performance of high demand applications.

Similar inefficiencies can be found in allocations of Sounding Reference Signal (SRS) resources. The SRS is transmitted by the UE in the uplink direction and used by the gNB to estimate the uplink and downlink channel quality. An SRS may provide information about the combined effect of, for example, multipath fading, scattering, and power loss of a transmitted signal. The SRS enables highly accurate channel estimations, for each UE device, that can be used by a gNB for allocating MIMO resources.

Without SRS, the gNB may rely on codebook information, such as a precoding matrix indicator (PMI), to allocate resources. By applying SRS resources, a radio access network (RAN) can provide higher throughput for UE devices than when using PMI. For example, UE devices can experience up to 40% higher throughput when allocating network resources based on SRS than with PMI. However, gNB antenna ports can only support a limited number of simultaneous SRS transmissions from UE devices. Furthermore, UE devices executing low throughput applications do not need SRS resources, which could be allocated elsewhere.

Systems and methods described herein provide a MIMO optimization service that considers the usage, application, and/or service associated with a UE device to decide when to provide SRS resources and/or MU-MIMO. A network device in a RAN predicts high usage thresholds and available per-service resources for supporting MIMO transmissions. The network device identifies, based on the predicted usage thresholds, UE devices that have a high-throughput session and have high usage levels on a cell. The network device assigns, based on the predicted available per-service resources, SRS-based MIMO resources to the UE devices in the cell and assigns codebook-based MIMO resources to other UE devices in the cell.

According to an embodiment, a predictive model is applied in the RAN to streamline the decision for allocating SRS and MIMO resources. The MIMO optimization service may be applied to a wireless environment. For example, the wireless environment may include a 5G wireless environment, a Fourth Generation (4G) wireless environment, or a future generation wireless environment, as described herein.

According to an embodiment, a network device (e.g., an evolved Node B (eNB), a gNB, a future generation wireless station, a wireless access point (WAP), an access device, or the like) that has MIMO capabilities may include logic of the MIMO optimization service. According to an embodiment, the MIMO optimization service may be implemented for UL and/or DL transmissions, as described herein. According to an embodiment, the MIMO optimization service may be applied to a cell, a sector, a sub-sector, zone, or carrier (referred to collectively herein as a "cell") associated with the RAN device. For example, the sub-sector/zone level may include multiple divisions of a geographic area of a sector relative to the RAN device. By way of further example, the sector may be divided based on proximity to the antenna of the RAN device (e.g., near, mid, far) and/or another criterion. According to an embodiment, the MIMO optimization service may be implemented for any radio frequency band, spectrum, carrier, or the like.

In view of the foregoing, the MIMO optimization service may improve a performance metric of traffic from the UE device perspective as well as optimize spectral efficiency from the network perspective based on the assignment of the MIMO configuration and associated layers for DL and UL transmissions. The MIMO optimization service may be implemented at the RAN-level without impacting or changing the core network.

FIG. 1A is a diagram illustrating an exemplary environment 100 in which an embodiment of a MIMO optimization service may be implemented. As illustrated, environment 100 includes an access network 110, an external network 120, and a core network 130. Access network 110 includes access devices 115 (also referred to individually or generally as access device 115). External network 120 includes external devices 125 (also referred to individually or generally as external device 125). Core network 130 includes core devices 135 (also referred to individually or generally as core device 135). Environment 100 further includes UE devices 190 (also referred to individually or generally as UE device 190).

The number, type, and arrangement of networks illustrated in environment 100 are exemplary. For example, according to other exemplary embodiments, environment 100 may include fewer networks, additional networks, and/ or different networks. For example, according to other exemplary embodiments, other networks not illustrated in FIG. 1A may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communication connection via a communication link may be direct or indirect. For example, an indirect communication connection may involve an intermediary device and/or an intermediary network not illustrated in FIG. 1A. A direct communication connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the MIMO optimization service may use at least one of these planes of communication.

Access network 110 may include one or multiple networks of one or multiple types and technologies. For example, access network 110 may be implemented to include a 5G RAN, a future generation RAN (e.g., a Sixth Generation (6G) RAN, or a subsequent generation RAN), a centralized-RAN (C-RAN), an Open-RAN (O-RAN), and/ or another type of access network. Access network 110 may include a legacy RAN (e.g., a Third Generation (3G) RAN, a 4G or 4.5 RAN, etc.). Access network 110 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 110.

Access network 110 may include different and multiple functional splitting, such as options 1, 2, 3, 4, 5, 6, 7, or 8 that relate to combinations of access network 110 and core network 130 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some embodiments, access network 110 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 110 may be implemented according to various wireless technologies (e.g., Radio Access Technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 110 may be implemented to include various wired and/or optical architectures for wired and/or optical access services.

Depending on the implementation, access network 110 may include one or multiple types of network devices, such as access devices 115. For example, access device 115 may include a gNB, an enhanced Long Term Evolution (eLTE) eNB, an eNB, a radio network controller (RNC), a RAN intelligent controller (RIC), a remote radio head (RRH), a baseband unit (BBU), a radio unit (RU), a remote radio unit (RRU), a central unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Central Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 115 may include a wired and/or an optical device (e.g., modem, wired access point, optical access point, Ethernet device, multiplexer, etc.) that provides network access and/or transport services.

According to some exemplary implementations, access device 115 may include a combined functionality of multiple radio access technologies (e.g., 4G and 5G functionality, 5G and 5.5G functionality, etc.) via soft and hard bonding based on demands and needs. According to some exemplary implementations, access device 115 may include a split access device (e.g., a CU-control plane (CP), a CU-user plane (UP), etc.) or an integrated functionality, such as a CU-CP and a CU-UP, or other integrations of split RAN nodes. Access device 115 may be an indoor device or an outdoor device.

According to various implementations, access device 115 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. According to various exemplary embodiments, access device 115 may be capable of establishing a wireless or radio connection with UE devices 190 via a cellular technology (e.g., 4G, 5G, Third Generation Partnership Project (3GPP), or the like) and/or via a non-cellular wireless technology (e.g., Wi-Fi, UWB, or the like).

According to an embodiment, at least some of access devices 115 may include logic for the MIMO optimization service. For example, access device 115 may, for each slot or transmission time interval (TTI) pertaining to the DL and/or the UL, calculate a MIMO selection for each UE device 190 of relevance based on reference signals (e.g., SRS, demodulation reference signal (DMRS), channel state information reference signal (CSI-RS), and/or the like) and/or codebook information (e.g., PMI, channel quality indicator (CQI), rank indicator (RI), and/or the like). Access device 115 may calculate and/or consider other values, factors, and/or criterion, such as power constraints, interference, the number of layers per UE device 190, pairing of UE devices for an MU-MIMO configuration, modulation scheme, and so forth. Access device 115 may assign UE devices 190 to a MIMO configuration.

External network 120 may include one or multiple networks of one or multiple types and technologies that provides an application service. For example, external network 120 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 120 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an UE application service.

Depending on the implementation, external network 120 may include various network devices such as external devices 125. For example, external devices 125 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by UE devices 190. By way of further example, external devices 125 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 120 may include one or multiple types of core devices 135, as described herein.

External devices 125 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 125 may also include other types of network devices that support the operation of external network 120 and the provisioning of application services, such as an orchestrator, an edge manager, an operations support system (OSS), a local domain name system (DNS), registries, and/or external devices 125 that may pertain to various network-related functions (e.g., security, management, charging, billing, authentication, authorization, policy enforcement, development, etc.). External devices 125 may include non-virtual, logical, and/or physical network devices.

Core network 130 may include one or multiple networks of one or multiple network types and technologies. Core network 130 may include a complementary network of access network 110. For example, core network 130 may be implemented to include a 5G core network, an evolved packet core (EPC) of an LTE network, an LTE-Advanced (LTE-A) network, and/or an LTE-A Pro network, a future generation core network (e.g., a 5.5G, a 6G, or another generation of core network), and/or another type of core network.

Depending on the implementation, core network 130 may include diverse types of network devices that are illustrated in FIG. 1A as core devices 135. For example, core devices 135 may include a user plane function (UPF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a mobility management entity (MME), a packet data network gateway (PGW), an enhanced packet data gateway (ePDG), a serving gateway (SGW), a home subscriber server (HSS), an authentication, authorization, and accounting (AAA) server, a policy and charging rules function (PCRF), and/or a charging system (CS).

According to other implementations, core devices 135 may include additional, different, and/or fewer network devices than those described. For example, core devices 135 may include a non-standard or a proprietary network device, and/or another type of network device that may be well-known but not particularly mentioned herein. Core devices 135 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 135 may include a split core device 135. For example, core devices 135 may include a session management (SM) PCF, an access management (AM) PCF, a user equipment (UE) PCF, and/or another type of split architecture associated with another core device 135, as described herein.

UE device 190 may include a device that may have communication capabilities (e.g., wireless, wired, optical, etc.). UE device 190 may or may not have computational capabilities. UE device 190 may be implemented as a mobile device, a portable device, a stationary device (e.g., a non-mobile device and/or a non-portable device), a device operated by a user, or a device not operated by a user. For example, UE device 190 may be implemented as a smartphone, a mobile phone, a tablet, a wearable device (e.g., a watch, glasses, etc.), a computer, a gaming device, a television, a set top box, an IoT device, a drone, a smart device, a fixed wireless device, a router, a sensor, an automated guided vehicle (AGV), an industrial robot, or other type of wireless device (e.g., other type of user equipment (UE)). UE device 190 may be configured to execute various types of software (e.g., applications, programs, etc.). The number and the types of programs may vary among UE devices 190. For purposes of description, UE device 190 is not considered a network device. UE device 190 may be implemented as a virtualized device in whole or in part. According to an embodiment, at least some of UE devices 190 include logic that supports a MIMO configuration. For example, these UE devices 190 may support SU-MIMO, MU-MIMO, and/or another type of beamforming, transmission and reception techniques using multiple antennas or the like.

Figure 1B:
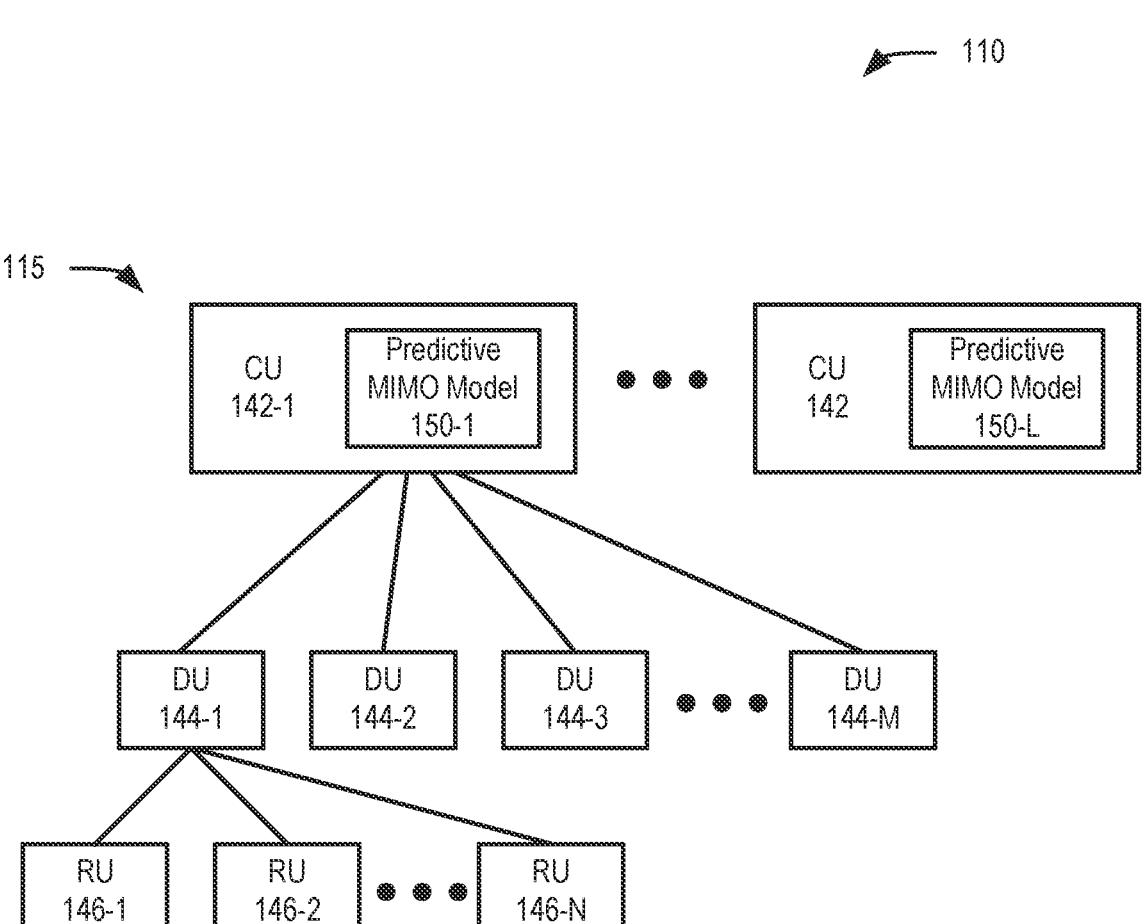

FIG. 1B is a diagram illustrating a configuration of access devices 115 in access network 110 consistent with environment 100, as described herein. As illustrated, access network 110 may include elements of a disaggregated RAN. The communication links and interfaces illustrated and described are exemplary in terms of number, connectivity, and type. The interfaces may be implemented as reference point-based or service-based. Access network 110 may include multiple access devices 115. Each access device 115 includes a CU 142 (e.g., one of CUs 142-1 through 142-L), DUs 144-1 through 144-M, and, for each DU 144, one or more RUs 146-1 through 146-N. RU 146 may also be referred to as a remote radio head (RRH). For simplicity, other DUs and RUs are not shown in FIG. 2. Each CU 142 and DU 144 may be implemented in dedicated hardware or as a virtual component (e.g., a vCU, vDU).

CUs 142 may control DUs 144 over a front haul interface. CUs 142 may manage, for example, sharing access network 120, conveying user data, mobility, sessions, etc. For each CU 142, there may be multiple DUs 144 controlled by the CU 142. CU 142 may process upper layers of the communication protocol stack for access devices 115. CUs 142 may not necessarily be physically located near DUs 144, and may be implemented as cloud computing elements, through NFV capabilities of the cloud. In one implementation, CU 142 communicates with components of core network 130 through S1/NG interfaces and with other CUs 142 through X2/Xn interfaces.

DUs 144 may be controlled by CU 142. Each DU 144 in access network 110 may be controlled by one CU 142. However, each DU 144 may send signals to multiple RUs 146 for transmission. DUs 144 may handle UE device mobility, from DU to DU, from an access device 115 to another access device 115, from a cell to another cell, from a beam to another beam, etc. DUs 144 communicate with a CU 142 through an F1 interface and may process lower layers of a communication protocol stack for access device 115.

RU 146 may provide radio frequency (RF) functionality to establish wireless channels with UE devices 190. RUs 146 may control beam shape, beam strength, and beam directions to balance traffic load over different bands. RU 146 may be embodied in different form factors having different sizes and various capabilities.

As shown in FIG. 1B, each CU 142 includes a predictive MIMO model 150. Predictive MIMO model 150 may track RAN/cell utilization data that may be used to predict usage levels and available resources (e.g., MIMIO resources) for future timeframes. For example, predictive MIMO model 150 may identify high usage times/cells for high-throughput sessions, such as for driving applications that are heavily used during a morning commute time on a highway or gaming applications used heavily during the evening in a residential area. Predictive MIMO model 150 may also predict high-throughput session use by premium subscribers, so as to be able to reserve SRS resources for corresponding timeslots and cells. As described further herein, predictive MIMO model 150 may identify usage thresholds and timeframes for cells that can be applied by access device 115 to trigger allocation of SRS-based MIMO resources. In one implementation, predictive MIMO model 150 may be generated via machine learning (ML), with each CU 142 developing and implementing its own model for its corresponding cells.

Figure 2B:
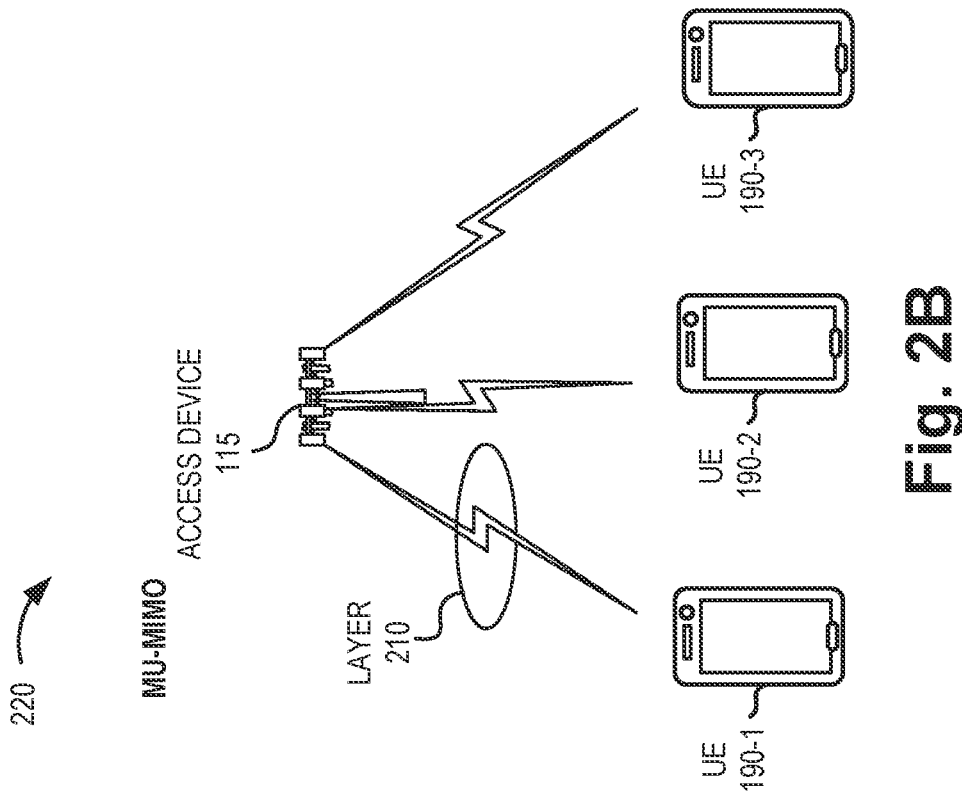
FIG. 2B is a diagram illustrating an example multiple user (MU)-MIMO configuration.
Figure 2A:
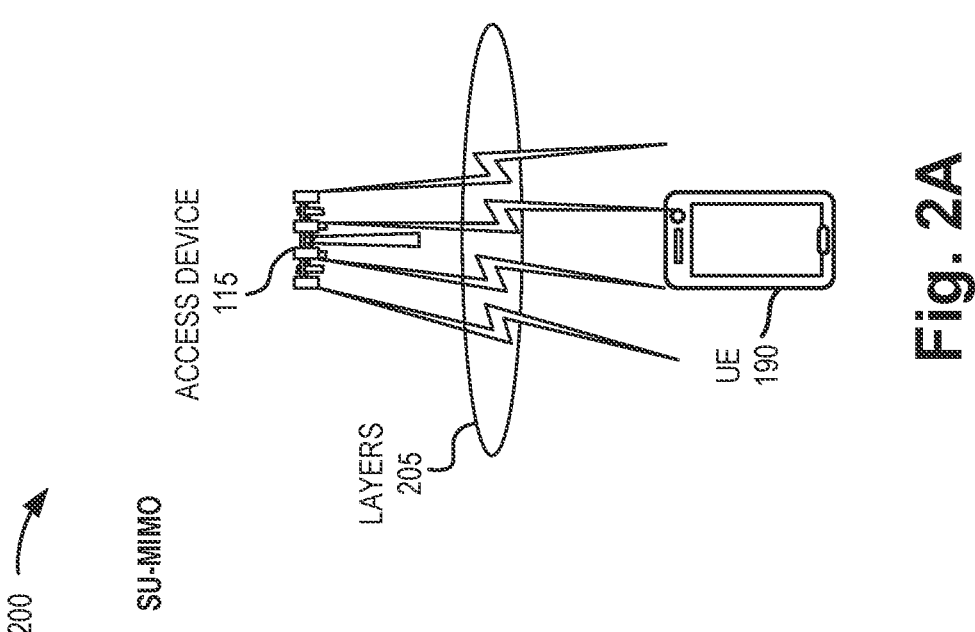
FIG. 2A is a diagram illustrating an example single user (SU)-MIMO configuration.

FIGS. 2A and 2B are diagrams illustrating an exemplary SU-MIMO configuration 200 and an exemplary MU-MIMO configuration 220, respectively. As illustrated, an exemplary environment may include UE device 190 and access device 115, which have been described herein. Referring to FIG. 2A, SU-MIMO configuration 200 may include layers 205, such as four layers or streams of data, to (a single) UE device 190. The number of layers 205 is exemplary. Referring to FIG. 2B, MU-MIMO configuration 220 may include layer 210, such as a single layer of streams of data, to each UE device 190 of multiple UE devices 190-1 through 190-3.

Figure 3:
FIG. 3 is a diagram illustrating exemplary components of a device that may correspond to one or more of the devices illustrated and described herein.
Figure 3:
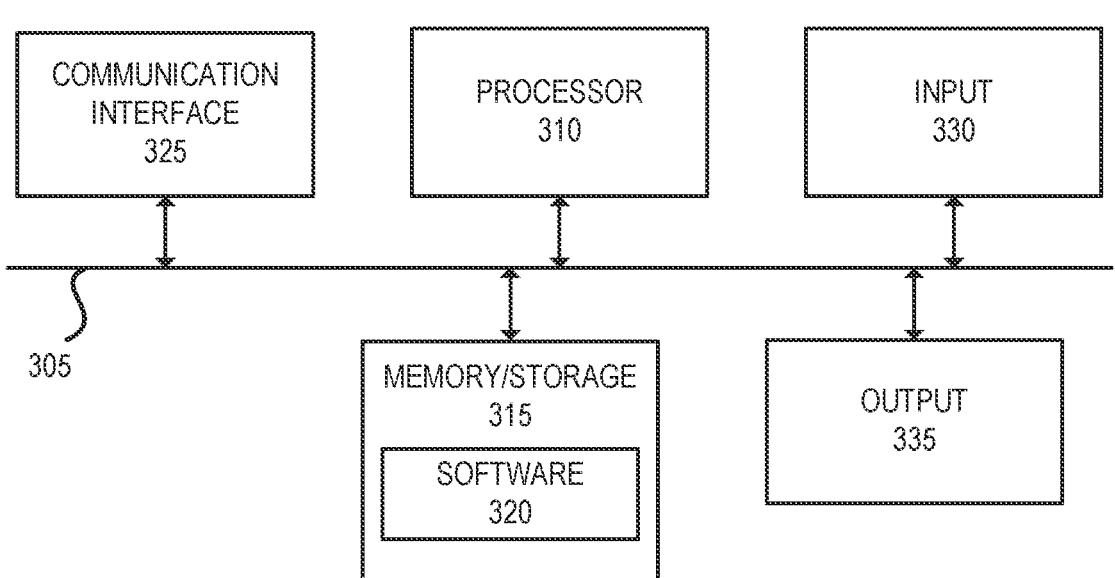

FIG. 3 is a diagram illustrating exemplary components of a device 300 that may be included in one or more of the devices described herein. For example, device 300 may correspond to access device 115, external device 125, core device 135, UE device 190, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to access device 115, software 320 may include an application that, when executed by processor 310, provides a function and/or a process of the MIMO optimization service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. Communication interface 325 may support one or multiple MIMO, beamforming, and/or transmission/reception configurations.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 115, core device 135, external device 125, and/or another type of network device or UE device 190, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 may be configured to perform a function or a process described herein based on the execution of hardware (processor 310, etc.).

Figure 4:
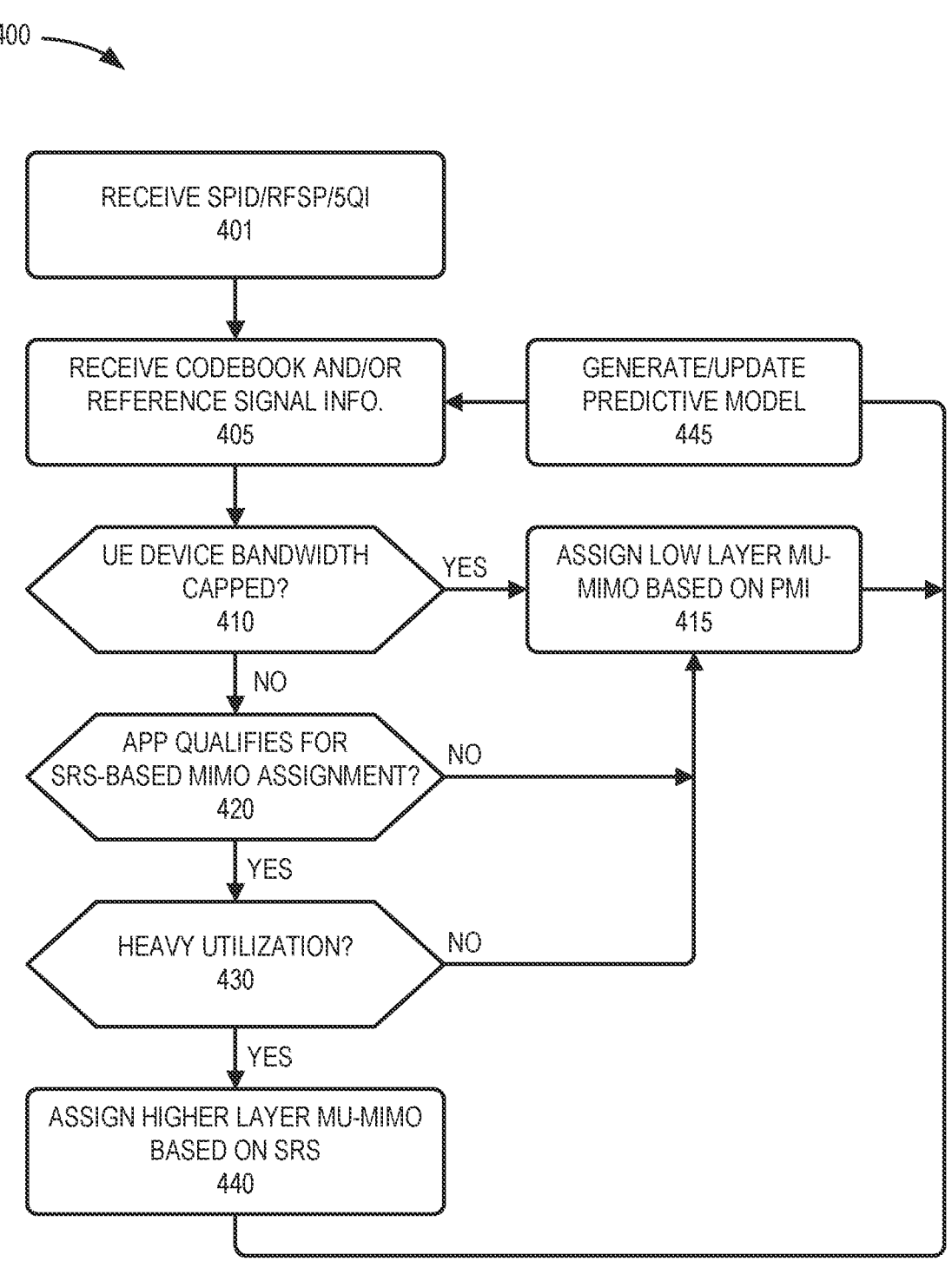
FIG. 4 is a flow diagram illustrating an exemplary process of an exemplary embodiment of the MIMO optimization service.

FIG. 4 is a flow diagram illustrating an exemplary process 400 of an embodiment of the MIMO optimization service. According to an exemplary embodiment, access device 115 may perform process 400. As described herein, access device 115 may be implemented as a cellular wireless device (e.g., gNB, eNB, eLTE eNB, or the like) or a non-cellular wireless device (e.g., a Wi-Fi device, a UWB device, etc.). According to an exemplary implementation, processor 310 executes software 320 to perform a step (in whole or in part) of process 400, as described herein. Alternatively, a step (in whole or in part) may be performed by execution of only hardware.

Referring to FIG. 4, process 400 may include receiving SPID/RFSP/5QI information for UE devices 190 (block 401), receiving codebook and/or reference signal information (block 405), and determining if the UE device has a bandwidth restriction (block 410). For example, access network 110 may be configured to prioritize MU-MIMO for a specific set of groups or services, identified by QoS flow (e.g., certain 5G QoS identifiers (5QI)), as well as a subscriber's UE identifiers (subscriber profile identifier (SPID)/ RAT frequency selection priority (RFSP)). Access device 115 may receive a SPID, RESP and/or 5QI for each UE device 190. Access device 115 may also store codebook information and/or reference signal information from UE device 190 and/or calculate information, based on reference signals (e.g., SRS), codebook information (e.g., PMI, CQI, RI, and/or the like), and other values, factors, and/or criterion, such as power constraints, interference, the number of layers per UE device 190, pairing of UE devices for an MU-MIMO configuration, modulation scheme, and so forth. To begin calculating a MIMO configuration, which includes a number of layers, for UE devices 190, access device 115 may determine if particular UE devices have a bandwidth restriction. For example, based on an SPID, access device 115 may determine if a UE device 190 is a FWA device, an IoT device, or another type of device that is capped at a bandwidth level (e.g., 100 Mbps, 300 Mbps, etc.) such that a high number of MU-MIMO are not needed.

If the UE device has a bandwidth restriction (block 410—Yes), process 400 may include selecting a PMI-based MIMO allocation (415). For example, if access device 115 detects that a UE device 190 has a bandwidth cap, access device 115 may use a service-differentiation-based approach to only allocate codebook-based (e.g., PMI) MIMO resources to these devices, so long as the capped bandwidth level of the UE device 190 is below a configurable threshold (e.g., 100 Mbps, 300 Mbps, or other levels that would not warrant higher layer MIMO transmissions).

If the UE device does not have a bandwidth restriction (block 410—No), process 400 may include determining if the requesting application qualifies for SRS-based MIMO assignment (block 420). For example, based on the SPID, RESP and/or 5QI, access device 115 may determine if the UE device 190 is using an application that can require high data levels for which SRS-based MU-MIMO allocation may be useful (referred to herein as a "high-throughput session"). In one implementation, the combination of SPID and 5QI may be used, for example, to identify a session for a gaming application or virtual reality application that may require high resource levels.

If the requesting application does not qualify for SRS-based MIMO assignment (block 420—No), process 400 may return to block 415 to provide codebook-based MIMO resources. For example, if access device 115 determines that the requesting application is not likely to benefit from SRS-based MIMO assignment, access device 115 may default to PMI-based resources for allocating MIMO layers for the corresponding UE device 190.

If the requesting application qualifies for SRS-based MIMO assignment (block 420—Yes), process 400 may include determining if heavy utilization is present/pending (block 430). In one implementation, even if the requesting application is capable of requiring high resource levels, access device 115 may first determine if the requesting application is actually using high bandwidth (e.g., at or above configurable bandwidth threshold that may be indicated by predictive MIMO model 150) for a particular interval. For example, when a user of a gaming application is in standby mode or waiting for other players to join, a UE device 190 may not be using data at high resource levels. At other times, an active gaming session may cause the UE device 190 to consume data at high resource levels.

If heavy utilization is not present/pending (block 430—No), process 400 may return to block 415 to provide codebook-based MIMO resources. For example, if there is low usage from an application, access device may treat the UE device 190 similar to other UE devices that use lower bandwidth applications. Thus, access device 115 may default to PMI resources for allocating lower level MIMO layers (e.g., layer 1 or layer 2) for the corresponding UE device 190.

If heavy utilization is present/pending (block 430—Yes), process 400 may include assigning SRS-based MU-MIMO layers for the high usage application (block 440). For example, when a high bandwidth application is actively being used on UE device 190, access device 190 may utilize SRS and assign SRS-based MU-MIMO layers (e.g., layers 2-4) for the application.

Process 400 may also include generating and/or updating a predictive model (block 445). For example, access device 115 may continue to collect historical data from each cell and apply the collected data to predictive MIMO model 150. Predictive MIMO model 150 may develop updated usage thresholds and predicted resources for subsequent timeframes. A CQI and RI database may be built/updated at each access device 115 (e.g., CU 142) based on the machine learning.

While FIG. 4 illustrates one example process of the MIMO optimization service, however, according to other exemplary embodiments, the MIMO optimization service may perform additional operations, fewer operations, and/or different operations than those illustrated and described. For example, access device 115 may schedule the slot or TTI pertaining to a prospective transmission or a prospective reception of data in an UL or a DL in accordance with the selected MIMO configuration and corresponding UE device (e.g., with a high-throughput session or without a high-throughput session). Access device 115 may subsequently transmit to or receive data from UE device 190 based on the schedule.

FIG. 5 is a flow diagram illustrating an exemplary process 500 of an embodiment of the MIMO optimization service. According to an exemplary embodiment, access device 115 may perform process 500. As described herein, access device 115 may be implemented as a cellular wireless device (e.g., eNB, eLTE eNB, gNB, or the like). According to an exemplary implementation, processor 310 executes software 320 to perform a step (in whole or in part) of process 500, as described herein. Alternatively, a step (in whole or in part) may be performed by execution of only hardware.

According to an exemplary embodiment, process 500 is described in relation to a binary choice selection between SRS-based MIMO and codebook-based MIMO. According to other exemplary embodiments, process 500 may include a higher number of choices (e.g., a ternary choice, a quaternary choice, or higher). For example, the available MIMO configurations may further include massive MIMO (M-MIMO), SU-MIMO, closed loop MIMO, open loop MIMO, or another type of beamforming configuration.

Process 500 may include predicting high usage thresholds and available per-service resources for supporting MIMO transmissions (block 505). For example, using predictive MIMO model 150 or other predictive logic, access device 115 may determine available MIMO resources for a cell and what utilization levels by a user (e.g., a UE device with a high-throughput session) will trigger SRS-based MIMO allocation.

Process 500 may further include identifying UE devices that have a high-throughput session and high usage levels on a cell (block 510). For example, access device 115 may use the SPID, RFSP, and 5QI from each session to identify sessions that are configured for high throughput. Access device 115 may apply thresholds (e.g., as determined in process block 505) to identity which high-throughput sessions have current utilization levels that warrant SRS-based MIMO allocation.

Process 500 may also include assigning SRS-based MIMO resources to the UE devices in the cell (block 515) and assigning codebook-based MIMO resources to other UE devices in the cell (block 520). For example, based on the predicted available per-service resources (e.g., as determined in process block 505), access device 115 may assign SRS-based MIMO resources to the UE devices 190 with high-throughput sessions that currently have high utilization rates (e.g., above the utilization threshold). Access device 115 may assign PMI-based MIMO resources to the UE devices 190 that do not meet the criteria for SRS-based resources.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
predicting, by a network device in a radio access network (RAN), high usage thresholds and available per-service resources for supporting multiple-input multiple-output (MIMO) transmissions;
identifying, by the network device and based on the predicted high usage thresholds, first user equipment (UE) devices that have a high-throughput session and have current high usage levels on a cell;
assigning, by the network device and based on the predicted available per-service resources, sounding reference signal (SRS)-based MIMO resources to the first UE devices in the cell; and
assigning, by the network device, codebook-based MIMO resources to second UE devices in the cell.

2. The method of claim 1, wherein the second UE devices are bandwidth capped.

3. The method of claim 1, wherein identifying the first UE devices that have the high-throughput session includes identifying the first UE devices based on at least two of:
a subscriber profile identifier (SPID) value;
a radio access technology (RAT) frequency selection priority (RFSP) value; or
a 5G Quality of Service (QOS) Identifier (5QI).

4. The method of claim 1, wherein assigning the codebook-based MIMO resources includes assigning MIMO layers based on a precoding matrix indicator (PMI).

5. The method of claim 1, wherein assigning the codebook-based MIMO resources includes assigning no more than two MIMO layers.

6. The method of claim 1, wherein assigning the SRS-based MIMO resources includes selecting two or more MIMO layers.

7. The method of claim 1, wherein the network device is a next generation Node B (gNB), an evolved Node B (eNB), or an enhanced Long Term Evolution (eLTE) eNB.

8. The method of claim 1, further comprising:

scheduling, by the network device, a slot or a transmission time interval based on the codebook-based MIMO resources or the SRS-based MIMO resources.

9. The method of claim 1, further comprising:

generating, by the network device, a machine learning model to predict the high usage thresholds and the available per-service resources.

10. A network device comprising:

a processor that is configured to:

predict, in a radio access network (RAN), high usage thresholds and available per-service resources for supporting multiple-input multiple-output (MIMO) transmissions;

identify, based on the predicted high usage thresholds, first user equipment (UE) devices that have a high-throughput session and have current high usage levels on a cell;

assign, based on the predicted available per-service resources, sounding reference signal (SRS)-based MIMO resources to the first UE devices in the cell; and assign codebook-based MIMO resources to second UE devices in the cell.

11. The network device of claim 10, wherein the second UE devices are bandwidth capped.

12. The network device of claim 10, wherein, when identifying the first UE devices that have the high-throughput session, the processor is further configured to identify the first UE devices based on at least two of:

a subscriber profile identifier (SPID) value;

a radio access technology (RAT) frequency selection priority (RFSP) value; or a 5G Quality of Service (QOS) Identifier (5QI).

13. The network device of claim 10, wherein, when assigning the codebook-based MIMO resources, the processor is further configured to:

assign no more than two MIMO layers based on a precoding matrix indicator (PMI).

14. The network device of claim 10, wherein the network device is a next generation Node B (gNB), an evolved Node B (eNB), or an enhanced Long Term Evolution (eLTE) eNB.

15. The network device of claim 10, wherein the processor is further configured to:

schedule a slot or a transmission time interval based on the codebook-based MIMO resources or the SRS-based MIMO resources.

16. The network device of claim 10, wherein the processor is further configured to:

apply a machine learning model to predict the high usage thresholds and the available per-service resources.

17. A non-transitory computer-readable storage medium storing instructions executable by a processor of a network device, wherein the instructions are configured to:

predict, in a radio access network (RAN), high usage thresholds and available per-service resources for supporting multiple-input multiple-output (MIMO) transmissions;

identify, based on the predicted high usage thresholds, user equipment (UE) devices that have a high-throughput session and have current high usage levels on a cell;

assign, based on the predicted available per-service resources, sounding reference signal (SRS)-based MIMO resources to the first UE devices in the cell; and assign codebook-based MIMO resources to second UE devices in the cell.

18. The non-transitory computer-readable storage medium of claim 17, wherein the instructions to identify the first UE devices that have the high-throughput session further comprise instructions to identify the first UE devices based on at least two of:

a subscriber profile identifier (SPID) value;

a radio access technology (RAT) frequency selection priority (RFSP) value; or a 5G Quality of Service (QoS) Identifier (5QI).

19. The non-transitory computer-readable storage medium of claim 17, wherein the instructions are further to:

apply a machine learning model to predict the high usage thresholds and the available per-service resources.

20. The non-transitory computer-readable storage medium of claim 17, wherein the network device is a next generation Node B (gNB), an evolved Node B (eNB), or an enhanced Long Term Evolution (eLTE) eNB.

\* \* \* \* \*